R. W. CURTIS.
BURETTE.
APPLICATION FILED JAN. 30, 1915.
1,136,108.
Patented Apr. 20, 1915.
Fig. 1
Fig. 2
Fig. 3
Fig. 4
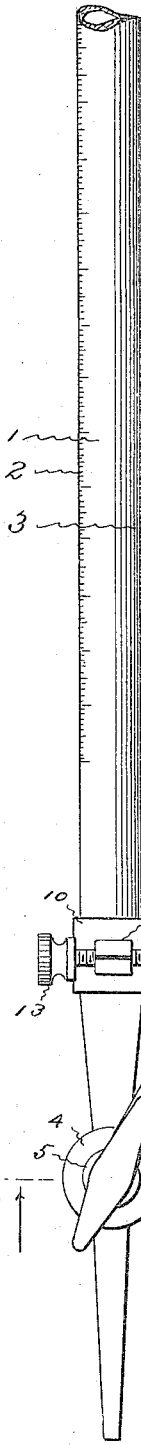
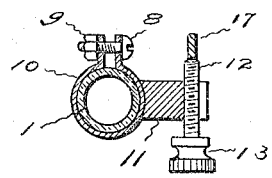
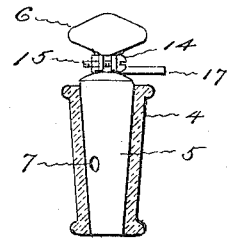
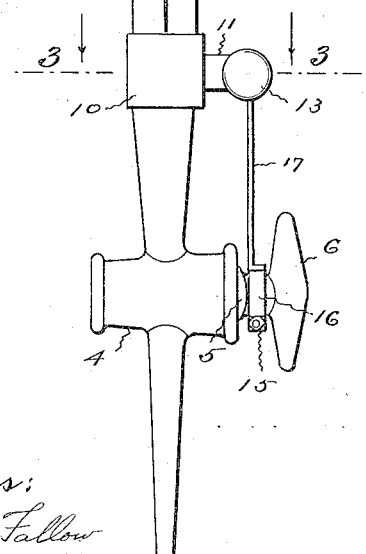
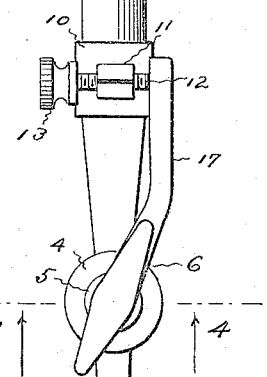
Witnesses:
Myrtle E. Fallow
Virie R. Parmelee
Inventor:
Robert W. Curtis,
Harry R. Williams
atty.

UNITED STATES PATENT OFFICE.

ROBERT W. CURTIS, OF NEW YORK, N. Y.

BURETTE.

1,136,108.  Specification of Letters Patent.  Patented Apr. 20, 1915.

Application filed January 30, 1915. Serial No. 5,166.

*To all whom it may concern:*

Be it known that I, ROBERT W. CURTIS, a citizen of the United States, residing at New York, in the county of New York and State of New York, have invented a new and useful Improvement in Burettes, of which the following is a specification.

This invention relates to those articles which consist of a long finely graduated glass tube having a restricted outlet at one end with a stop cock near the outlet, that are used chiefly by chemists and pharmacists for drawing off small measured quantities of liquid solutions, particularly in connection with the making of volumetric analyses in laboratories.

In completing the process of "titration", or the causing of a given reaction between a solution containing a known amount of substance and a solution of a previously determined value, so the proportion of the desired ingredient may be established, much used in research and commercial laboratories, it is very essential to be able to obtain, at will, one drop, of a solution, and, of course, the size of the drops, and the rapidity of their formation and precipitation from the outlet of a burette depends upon the size of the opening through the burette cock, which is regulated according to the density and viscosity of the solution, but should always be the same for the same solution.

The object of the present invention is to provide an article of this nature with simple and cheap means which will enable the chemist to easily, quickly, definitely and surely, obtain, at will, one drop of liquids of various degrees of fluidity, and thereby be assured of the definiteness of his steps and the accuracy of his results and conclusions. This end is attained by clamping means that has a finely adjustable stop to the tube of the burette, and clamping to the plug of the cock means which may be arranged so as to extend into engagement with the stop when the cock is turned just the right amount to allow the exact size of drop of the particular solution to form in the desired time at the outlet end of the tube, thus mechanically insuring uniformity in rate and volume of the discharge from the tube and eliminating from the proposition the factors of personal judgment and the effect of the nervous tension of the user.

Figure 1 of the accompanying drawings shows a front elevation of the lower end of a burette provided with my improvement. Fig. 2 shows a side view of the same. Fig. 3 shows a transverse section on the plane indicated by the dotted lines 3—3 on Fig. 1. Fig. 4 shows a transverse section on the plane indicated by the dotted line 4—4 on Fig. 2.

The tube 1 of these instruments is commonly made of transparent glass about two feet long and has graduations 2 in front of a strip 3 on the back which is rendered more or less opaque so that the relation of the level of the top of the solution in the tube to the graduations may be clearly observed. The lower end of the tube is drawn down so that the bore is reduced to a small cross-section. Just above the discharge end the glass is formed into a cylinder 4 which has an opening through it that is transverse to the bore of the tube. The opening through this cylinder is slightly tapering, and ground into it is the slightly tapered plug 5 of the cock. At one end the plug has a handle 6 by means of which it may be turned. Through the plug is a small port 7.

Adjustably clamped on the tube some distance above the cock, preferably by a screw 8 and nut 9, is a band 10, and extending sidewise from the band is a block 11 which has a split end and a threaded perforation extending horizontally through this end. Turning in the threaded perforation through the end of the block is a screw 12 with a head 13 which may be easily grasped by the thumb and finger.

Adjustably clamped by a screw 14 and nut 15 on the neck of the plug is a band 16. Projecting from this band is a long arm 17. The band is located on the neck of the plug so that the upper end of the arm will come into contact with the end of the screw carried by the band which is adjustably fastened to the tube, when the plug is turned so that the opening through it is just the right size to allow the correct quantity of liquid in the tube to escape and form in drops at the lower reduced outlet end of the tube. In order to insure drops of just the right volume and provide for their formation at just the desired intervals, after the arm has been adjusted to give approximately the size of the drops, the screw is turned either one way or the other to complete the adjustment. As the arm is of considerable length and engages the end of the screw at some distance from the axis of the plug of the cock, and as the screw has a fine thread, such an adjustment can be obtained that with the particular solution being used, notwithstanding its density or viscosity, exactly the desired size of drops will be formed at precisely the desired rate whenever the cock is turned for opening it and the arm brought into engagement with the end of the screw.

As stated, the arm is adjusted to give approximately the desired discharge and then the screw is adjusted to render the discharge more exact than could be obtained by the adjustment of the arm.

In using this instrument the cock is first turned to closed position. The tube is then filled with the liquid to be drawn off in measured quantities. After the tube is filled the cock is turned fully open to allow a small quantity of the liquid to run out in order that any imprisoned air will be removed, after which the cock is closed. The necessary adjustments are then obtained and when it is desired to obtain a drop, or any number of drops, of the solution in the tube the cock is turned until the outer end of the arm engages the stop screw. As a result of this a uniform flow of the exact size of drops at the precise rate of speed may be obtained as desired. When it is desired to stop the discharge of the measured quantities of liquid the cock is closed. If more of the liquid is required the cock is again opened and with the arrangement which is described herein, no matter how many times the cock is closed, when it is subsequently opened the size of the drops and the rate of their formation and discharge will always be the same.

The invention claimed is;

1. The combination with a burette consisting of a graduated glass tube having a reduced lower discharge end and a cock above said end, of an arm extending from the plug of the cock, means for clamping the arm to the cock plug, a threaded adjustable stop with which the end of said arm may be engaged, and means clamping said stop to the tube at a distance above the cock.

2. The combination with a burette consisting of a graduated glass tube having a reduced lower discharge end and a cock above said end, of a band adjustably clamped to the neck of the cock, an arm extending from said band, a band adjustably clamped to the tube above the cock, a block extending outwardly from said latter band, and a screw turning in the outer end of said block in position to be engaged with the end of the arm projecting from the cock plug.

ROBERT W. CURTIS.

Witnesses:
RUDOLPH J. FINKE,
F. H. KNAPP.

Copies of this patent may be obtained for five cents each, by addressing the "Commissioner of Patents, Washington, D. C."